(12) United States Patent
Blair et al.

(10) Patent No.: US 7,859,136 B2
(45) Date of Patent: *Dec. 28, 2010

(54) WALL-MOUNTABLE TIMER FOR AN ELECTRICAL LOAD

(75) Inventors: Edward J. Blair, Telford, PA (US); Aaron Dobbins, Hopedale, MA (US); Nicole R. Vigue, Niagara Falls, NY (US); Elliot G. Jacoby, Glenside, PA (US); Robert C. Newman, Jr., Emmaus, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/502,844

(22) Filed: Jul. 14, 2009

(65) Prior Publication Data

US 2009/0273243 A1 Nov. 5, 2009

Related U.S. Application Data

(63) Continuation of application No. 11/521,234, filed on Sep. 13, 2006, now Pat. No. 7,579,717.

(51) Int. Cl.
*H01H 7/00* (2006.01)
(52) U.S. Cl. .................................... 307/141
(58) Field of Classification Search ............. 307/141
See application file for complete search history.

(56) References Cited

U.S. PATENT DOCUMENTS 3,939,361 A 2/1976 Aidala et al.

4,015,139 A 3/1977 Cleary et al.

(Continued)

FOREIGN PATENT DOCUMENTS

DE 4002597 A1 8/1991

(Continued)

OTHER PUBLICATIONS

Lutron Electronics Co., Inc., "Introduction", Homeworks Technical Reference Guide Rev G, Feb. 2005, front cover, pp. 2-8, rear cover.

(Continued)

*Primary Examiner*—Robert L. DeBeradinis
(74) *Attorney, Agent, or Firm*—Mark E. Rose; Philip N. Smith (57) ABSTRACT

A wall-mountable electrical timer for controlling the delivery of power from an AC power source to an electrical load, such as a lamp or a fan motor, includes: a timer adjustment actuator for selecting a predetermined time period of operation for the load; a toggle actuator for starting the timer, turning off the timer, and placing the timer in a bypass mode of operation; a vertical linear array of light-emitting diode visual indicators for indicating the length of a predetermined time period, the time remaining, and whether the timer is in the bypass mode; a controllably conductive device for regulating the delivery of power from the AC source to the load; and a controller for receiving inputs from the timer adjustment actuator and the toggle actuator, and for transmitting outputs to the visual indicators and the controllably conductive device.

17 Claims, 6 Drawing Sheets

U.S. PATENT DOCUMENTS

| | | |
|---|---|---|
| 4,082,961 A | 4/1978 | Genuit |
| 4,204,149 A | 5/1980 | Cleary et al. |
| RE30,295 E | 6/1980 | Cleary et al. |
| 4,259,618 A | 3/1981 | Nilssen |
| 4,322,632 A | 3/1982 | Hart et al. |
| 4,336,464 A | 6/1982 | Weber |
| 4,338,562 A | 7/1982 | Terwilliger |
| 4,360,739 A | 11/1982 | Goldstein |
| 4,382,192 A | 5/1983 | Mendelson |
| 4,389,599 A | 6/1983 | Jabor |
| 4,413,211 A | 11/1983 | Fowler |
| 4,422,018 A | 12/1983 | Bailey |
| 4,425,532 A | 1/1984 | Sinkauz |
| 4,480,197 A | 10/1984 | Hollaway |
| 4,494,012 A | 1/1985 | Coker |
| 4,500,795 A | 2/1985 | Hochstein et al. |
| 4,540,984 A | 9/1985 | Waldman |
| 4,591,781 A | 5/1986 | Larson |
| 4,649,323 A | 3/1987 | Pearlman et al. |
| 4,695,739 A | 9/1987 | Pierce |
| 4,896,079 A | 1/1990 | Tabor |
| 4,924,109 A | 5/1990 | Weber |
| 5,030,890 A | 7/1991 | Johnson |
| 5,051,607 A | 9/1991 | Dalton |
| 5,160,853 A | 11/1992 | Simon et al. |
| 5,248,919 A | 9/1993 | Hanna et al. |
| 5,319,283 A | 6/1994 | Elwell |
| 5,399,940 A | 3/1995 | Hanna et al. |
| 5,473,204 A | 12/1995 | Temple |
| 5,488,273 A | 1/1996 | Chang |
| RE35,220 E | 4/1996 | Johnson |
| 5,511,943 A | 4/1996 | Chang |
| 5,559,406 A | 9/1996 | Chang |
| 5,715,214 A | 2/1998 | Svarnias |
| 5,798,620 A | 8/1998 | Wacyk et al. |
| 5,808,423 A | 9/1998 | Li et al. |
| 6,107,758 A | 8/2000 | Fischer et al. |
| 6,121,889 A | 9/2000 | Janda et al. |
| 6,572,338 B2 | 6/2003 | Janisse et al. |
| 6,927,547 B2 | 8/2005 | Walko, Jr. et al. |
| 7,026,729 B2 | 4/2006 | Homan et al. |
| 7,579,717 B2 * | 8/2009 | Blair et al. .......... 307/141 |
| 7,683,504 B2 | 3/2010 | Blair et al. |
| 2003/0057880 A1 | 3/2003 | Hudson |
| 2004/0206609 A1 | 10/2004 | Tilley |
| 2005/0062442 A1 | 3/2005 | Lu |
| 2005/0063200 A1 | 3/2005 | Lu |
| 2005/0094493 A1 | 5/2005 | Walko, Jr. |
| 2005/0242753 A1 | 11/2005 | Morrison et al. |
| 2008/0061633 A1 | 3/2008 | Blair et al. |

FOREIGN PATENT DOCUMENTS

GB     2133232 A     7/1984

OTHER PUBLICATIONS

Leviton Manufacturing Co., Inc., "Timers", The Decora Collection of Designer Devices Catalog, 2001, front cover, pp. E13-E14, rear cover.

Intermatic Incorporated, Electronic Countdown Timers, 2004, 2 pages.

Intermatic Incorporated, In Wall Timers, 2003, 4 pages.

Intermatic Incorporated, EJ500C Product Fact Sheet, Aug. 1, 2004, 1 page.

Intermatic Incorporated, Easyset Programming the Intermatic EJ500C Timer, Feb. 24, 2006, 2 pages.

Smarthome, Inc., Insteon SwitchLinc Timer V2 User's Guide, 2005, 28 pages.

Smarthome, Inc., Insteon SwitchLinc Timer V2 Quick-Start Guide, 2005, 4 pages.

European Patent Office, International Search Report and Written Opinion for PCT Application No. PCT/US2007/078354, Mar. 31, 2008, 11 pages.

Description of Intermatic EI210 Electronic In-Wall Countdown Timer, which was available to the public at least as early as 2004, 2 pages.

\* cited by examiner

WALL-MOUNTABLE TIMER FOR AN ELECTRICAL LOAD

CROSS REFERENCE TO RELATED APPLICATIONS

This application is a continuation of commonly-assigned U.S. patent application Ser. No. 11/521,234, filed Sep. 13, 2006, now U.S. Pat. No. 7,579,717, issued Aug. 25, 2009, entitled WALL-MOUNTABLE TIMER FOR AN ELECTRICAL LOAD, the entire disclosure of which is hereby incorporated by reference.

BACKGROUND OF THE INVENTION

1. Field of the Invention

The present invention relates to load control devices for controlling the amount of power delivered to an electrical load from a source of alternating-current (AC) power, and more particularly, to a wall-mountable electronic timer for supplying power to a connected electrical load for a predetermined amount of time selectable by a user.

2. Description of the Related Art

In response to increasing awareness of energy conservation, many lighting control devices, such as dimmers, electronic timers, occupancy sensors, and daylight sensors, provide means for energy management of lighting loads in commercial and residential installations. Specifically, electronic timers operate to turn off a connected electrical load after a predetermined amount of time after the electrical load is turned on. Typically, the electronic timer includes a switching device, such as a relay, coupled in series electrical connection between an AC power source and the electrical load. Often, electronic timers are adapted to be mounted in electrical wall-boxes and are used in rooms, such as bathrooms, where a light or an exhaust fan may be turned on when the room is first in use, and left on after the room is no longer in use.

One prior art wall-mounted electronic timer is the Decora® electronic timer (e.g., part number 6515M) manufactured by Leviton Manufacturing Co., Inc. The electronic timer comprises four buttons, each corresponding to a different timeout period, e.g., two minutes, five minutes, ten minutes, and fifteen minutes. The buttons are each labeled with the corresponding timeout period. Actuating one of the four buttons turns a connected electrical load on and begins a countdown with the corresponding timeout period. After this period of time expires, the electrical load is turned off. A visual indicator, e.g., a light-emitting diode (LED), is located next to or in each of the buttons and illuminates to indicate how much time is left in the timeout period. For example, if there are nine minutes left until the lighting load is turned off, the visual indicator corresponding to the timeout period of ten minutes will be illuminated. During the last few minutes, e.g., the last two (2) minutes, of the timeout period, the visual indicator next to the bottom button blinks quickly. Further, the electronic timer has an off button located below the other four buttons. When the off button is actuated, the electrical load is immediately turned off.

Another wall-mounted prior art electronic timer is an electronic in-wall countdown timer (part number EI210) manufactured by Intermatic Incorporated. This electronic timer has a single button and four visual indicators located in a linear array on a front surface of the timer. Selectable timeout periods are listed beside the visual indicators and include ten minutes, fifteen minutes, thirty minutes, and sixty minutes. Repeatedly pressing the single button cycles the electronic timer between the four different timeout periods and causes the corresponding visual indicator to illuminate. Pressing and holding the single button causes the electronic timer to enter a bypass mode, i.e., the timing function is disabled and the timer will supply power until manually turned off. A fifth visual indicator, which is located below the other four visual indicators, is illuminated when the electronic timer is in the bypass mode.

However, typical prior art electronic timers have user interfaces that provide limited functionality, require a high level of cognition to operate, and have an unsatisfactory aesthetic appearance. For example, the Leviton electronic timer does not offer a bypass mode. With the Intermatic electronic timer, a user must repeatedly press the single button to turn an electrical load on with a long timeout period or to turn off the lighting load. Further, the functional buttons and visual indicators of typical prior art electronic timers are not attractive, especially in a residential installation. Also, prior art electronic timers typically look much different than other lighting controls, such as switches and dimmers, that might be ganged next to the electronic timer.

Some electronic dimmers, such as, for example, the Maestro® smart dimmer, have offered a user interface that allows access to many features, is easy to use, and provides an attractive appearance. The Maestro® dimmer is described in greater detail in U.S. Pat. No. 5,248,919, issued Sep. 29, 1993, entitled LIGHTING CONTROL DEVICE, the entire disclosure of which is hereby incorporated by reference.

Therefore, there is a need for an electronic timer having a simple user interface that provides an attractive appearance, is easy to use, and allows access to many features.

SUMMARY OF THE INVENTION

According to the present invention, a wall-mountable load control device for controlling the power delivered to an electrical load from an AC power source comprises a controllably conductive device, a controller, a toggle actuator, a timer adjustment actuator, and a plurality of visual indicators. The controllably conductive device has a control input and is adapted to be coupled in series electrical connection between the source and the load for controlling the delivery of power to the load. The controller includes a timer and is operatively coupled to the control input of the controllably conductive device to control the conductivity of the controllably conductive device. The toggle actuator, the timer adjustment actuator, and the plurality of visual indicators are operatively coupled to the controller. The controller is operable to select a preset timeout period in response to an actuation of the timer adjustment actuator, cause the visual indicators to display a representation of the preset timeout period, control the conductivity of the controllably conductive device so as to enable the delivery of power to the load in response to a first actuation of the toggle actuator, start the timer, which is initialized with the preset timeout period, in response to the first actuation of the toggle actuator, and control the conductivity of the controllably conductive device so as to prevent the delivery of power to the load when the preset timeout period has elapsed.

According to a second embodiment of the present invention, a wall-mountable electrical timer for controlling the power delivered to an electrical load from an AC power source comprises a toggle actuator for enabling delivery of power to the load, a countdown timer, and a plurality of visual indicators. The countdown timer is adapted to begin counting down for a predetermined period of time in response to an actuation of the toggle actuator. The electrical timer disables the delivery of power to the load in response to the countdown timer having counted down for the predetermined period of time. The plurality of visual indicators are operable to provide an animated visual feedback to indicate that the countdown timer is counting down for the predetermined time period.

According to another embodiment of the present invention, a wall-mountable electrical timer for controlling the power delivered to an electrical load from an AC power source comprises a toggle actuator operable to cause the electrical timer to turn on and enter a countdown mode in response to a first actuation of the toggle actuator. The load is turned off after a predetermined time period after the load is turned on. The toggle actuator is further operable to cause the electrical timer to enter a bypass mode in response to a second actuation of the toggle actuator. The load is indefinitely turned on in the bypass mode. The electronic timer further comprises a plurality of visual indicators operable to illuminate with a first color when the electrical timer is in the countdown mode and to illuminate with a second color when the electrical timer is in the bypass mode.

In addition, the present invention provides a two-wire wall-mountable electrical timer, which is operable to control the power delivered to an electrical load from an AC power source and comprises a toggle actuator for turning on the load and a plurality of visual indicators. The electrical timer is operable to turn off the load after a preset timeout period after the load is turned on. The visual indicators are operable to provide a visual feedback when the load is off.

According to yet another aspect of the present invention, a wall-mountable electrical timer for controlling the power delivered to an electrical load from an AC power source comprises a toggle actuator. The electrical timer is responsive to a single-tap actuation of the toggle actuation to only: (1) turn the load on for a predetermined time period in response to a first single-tap actuation of the toggle actuator; and (2) turn the load off in response to a second subsequent single-tap actuation of the toggle actuator.

The present invention further provides a load control device for controlling the state of an electrical load. The load control device comprises a user-actuable timer adjustment means for selecting a preset timeout period between a minimum preset timeout period and a maximum preset timeout period, and a single control switch, independent of said user-actuable timer adjustment means, for generating control signals in response to an input from a user. The load control device further comprises control means operatively coupled to said timer adjustment means and said control switch for causing the load to: (i) change from an off state to a countdown state when said input from a user causes a first single switch closure of transitory duration, the load turned on in the countdown state; (ii) change from the countdown state to the off state after the preset timeout period after the load is changed from the off state to the countdown state; (iii) change from the off state to a bypass state when said input from a user causes multiple switch closures of transitory duration occurring within a predetermined time interval, the load turned on indefinitely in the bypass state; and (iv) change from one of the countdown state and the bypass state to the off state when said input from a user causes a second single switch closure of transitory duration subsequent to said first single switch closure of transitory duration.

In addition, the present invention provides a user interface for a wall-mountable electrical timer operable to control the power delivered to an electrical load from an AC power source. The user interface comprises a timer adjustment actuator for adjustment of a preset timeout period of the electrical timer; a plurality of visual indicators operable to display a representation of the preset timeout period, and a toggle actuator for enabling power to be delivered to the load. The electrical timer is operable to discontinue delivering power to the load after the preset timeout period has elapsed.

The present invention further provides a method of controlling the power delivered to an electrical load from an AC power source with a wall-mountable load control device. The method comprises the steps of: (1) selecting a preset timeout period using a timer adjustment actuator; (2) displaying a representation of the preset timeout period using a plurality of visual indicators; (3) actuating a toggle actuator; (4) enabling the delivery of power to the load in response to the step of actuating the toggle actuator; (5) initializing a timer with the preset timeout period; (6) starting the timer in response to the step of actuating the toggle actuator; and (7) discontinuing the delivery of power to the load when the preset timeout period has elapsed.

According to another embodiment of the present invention, a method of controlling the power delivered to an electrical load from an AC power source with a wall-mountable load control device comprises the steps of: (1) actuating a toggle actuator; (2) enabling the delivery of power to the load in response to the step of actuating the toggle actuator; (3) initializing a countdown timer with a predetermined time period; (4) starting the countdown timer in response to the step of actuating the toggle actuator; (5) discontinuing the delivery of power to the load when the predetermined time period has elapsed; and (6) providing an animated visual feedback to indicate that the countdown timer is counting down for the predetermined time period after the step of starting the countdown timer and prior to the step of discontinuing the delivery of power.

According to yet another aspect of the present invention, a method of controlling the power delivered to an electrical load from an AC power source with a wall-mountable load control device comprises the steps of: (1) actuating a toggle actuator; (2) enabling the delivery of power to the load in response to the step of actuating the toggle actuator; (3) discontinuing the delivery of power to the load when a preset timeout period has elapsed; and (4) providing a visual feedback before the step of enabling of the delivery of power to the load and after the step of discontinuing the delivery of power to the load.

The present invention further provides a method of controlling the power delivered to an electrical load from an AC power source with a wall-mountable load control device, which comprises the steps of: (1) actuating a toggle actuator; (2) enabling the delivery of power to the load in response to the step of actuating the toggle actuator; (3) discontinuing the delivery of power to the load when a preset timeout period has elapsed; (4) illuminating a visual indicator with a first color after the step of enabling the delivery of power to indicate a time period remaining until the step of discontinuing the delivery of power; (5) entering a bypass mode in which power is indefinitely provided to the load; and (6) illuminating a visual indicator with a second color after the step of entering the bypass mode.

Other features and advantages of the present invention will become apparent from the following description of the invention that refers to the accompanying drawings.

DETAILED DESCRIPTION OF THE INVENTION

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

Figure 1:
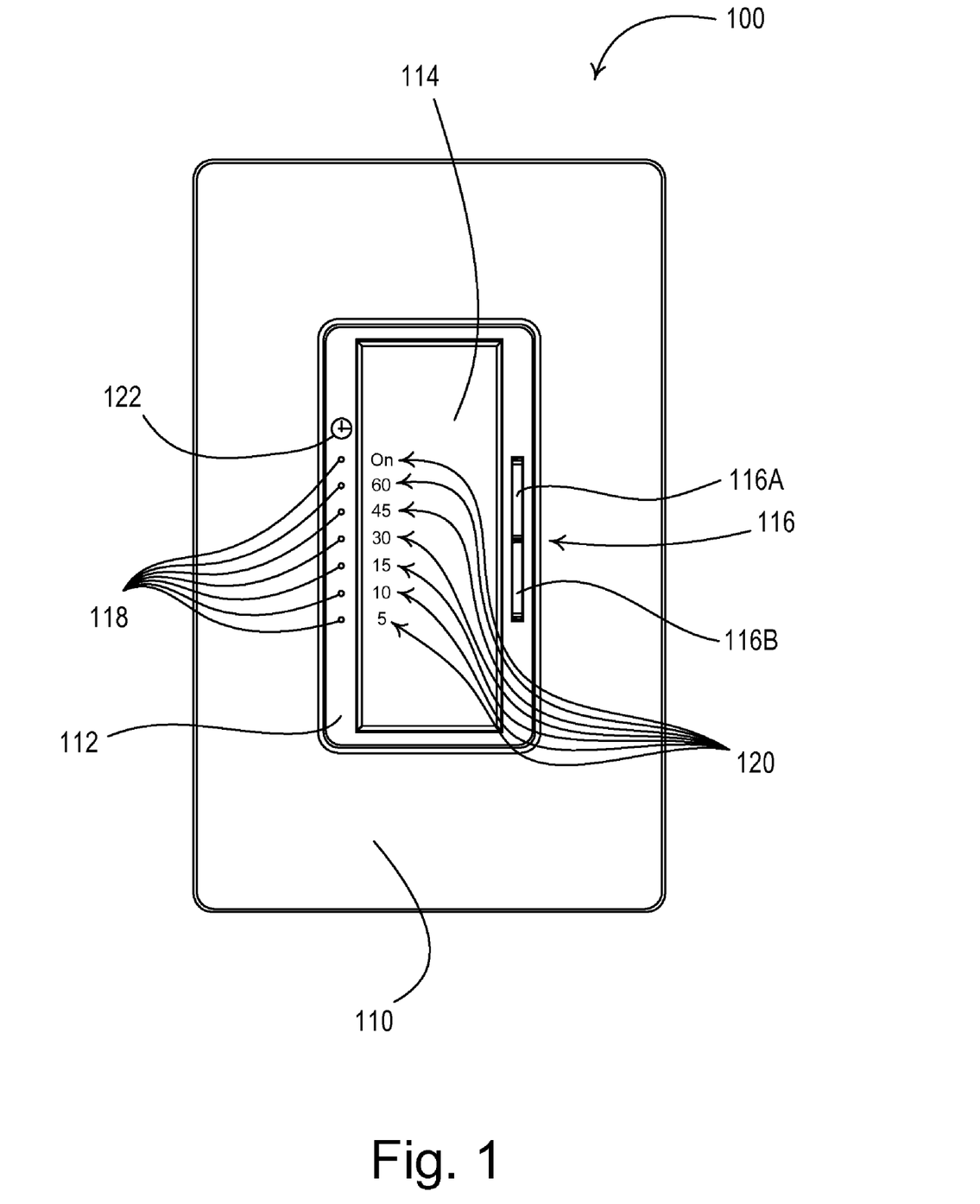
FIG. 1 is a front view of an electronic timer according to the present invention.

FIG. 1 is a front view of an electronic timer 100 according to the present invention. The electronic timer 100 comprises a faceplate 110 and a bezel 112 received in an opening of the faceplate. The electronic timer 100 further comprises a toggle actuator 114 and a timer adjustment actuator 116, i.e., a rocker switch. Actuations of the toggle actuator 114 toggle, i.e., turn off and on, a connected electrical load, for example, a lighting load 204 (FIG. 2) or a motor load, such as an exhaust fan. Actuations of an upper portion 116A or a lower portion 116B of the timer adjustment actuator 116 respectively increase or decrease a preset timeout period of the electronic timer 100. The electronic timer 100 is operable to turn off the lighting load 204 at the end of the preset timeout period after the lighting load is turned on. The operation of the electronic timer 100 in response to actuations of the toggle actuator 114 and the upper and lower portions 116A, 116B of the timer adjustment actuator 116 is described in greater detail below.

A plurality of visual indicators 118, e.g., light-emitting diodes (LEDs), are arranged in a vertical linear array on the left side of the bezel 112. The visual indicators 118 are illuminated to represent the present value of the preset timeout period, or to display the amount of time left until the lighting load 204 is turned off. Labels 120 are engraved into the toggle actuator 114 next to the visual indicators 118 and may comprise numerical representations of the possible preset timeout periods that the associated visual indicator 118 represents. The electronic timer 100 may further comprise a timer icon 122 above the linear array of visual indicators 118.

When the lighting load 204 is off, i.e., the electronic timer 100 is in an off mode or an off state, a user of the electronic timer may determine a desired amount of time for the preset timeout period, i.e., the amount of time that the lighting load will remain on after the lighting load is turned on. Accordingly, the user may actuate the upper and lower portions 116A, 116B of the timer adjustment actuator 116 to select one of a plurality of predetermined values of the timeout period, e.g., five (5) minutes, ten (10) minutes, fifteen (15) minutes, thirty (30) minutes, forty-five (45) minutes, and sixty (60) minutes, as shown in FIG. 1. As the user actuates the timer adjustment actuator 116, the electronic timer 100 offers a pre-on visual feedback by illuminating one of the visual indicators 118 to designate the present value of the timeout period. For example, if the middle visual indicator 118 next to the text '30' is illuminated, the timeout period will be thirty (30) minutes. Note that actuation of the timer adjustment actuator 116 does not cause the lighting load 204 to turn on.

After selecting the desired timeout period, the user can turn on the lighting load 204 by actuating the toggle actuator 114. At this time, the electronic timer 100 enters a countdown mode and starts a countdown timer having an initial value equal to the desired timeout period. The electronic timer 100 illuminates the visual indicator 118 that corresponds to the desired timeout period. As the countdown timer decreases, the electronic timer 100 illuminates one of the visual indicators 118 to represent the amount of time left until the lighting load 204 is turned off. For example, if there are ten (10) minutes left in the countdown timer, the electronic timer 100 illuminates the visual indicator 118 adjacent the text '10' on the toggle actuator 114.

As the countdown timer is counting down to zero, the electronic timer 100 preferably provides an animated visual feedback, i.e., the electronic timer illuminates the visual indicators 118 to show that the electronic timer 100 is actively counting down to zero. According to a preferred embodiment of the present invention, the electronic timer 100 cycles in a downward fashion the visual indicators below the visual indicator which represents the remaining time. For example, if there are forty-five (45) minutes left in the countdown timer, the visual indictor 118 next to the label 120 of '45' is illuminated constantly, while the four visual indicators below the constantly illuminated visual indicator are turned on and off in a decreasing fashion at a first rate (or "frequency"). Specifically, the '30' visual indicator is turned on for one second and then off. Next, the '15' visual indicator is turned on for one second and then off. Next, the '10' visual indicator is turned on for one second and then off. Finally, the '5' visual indicator is turned on for one second and then off. When there are five (5) minutes or less remaining in the countdown timer, the bottom visual indicator 118 blinks at a rate substantially equal to the first rate (i.e., on for one second and off for one second). Alternatively, other implementations of the animation of the visual indicators 118 may be used to illustrate that the countdown timer is actively counting down to zero minutes.

When there is a small amount of time left in the countdown timer, e.g., one (1) minute, the electronic timer 100 provides a pre-off visual feedback by blinking the bottom visual indicator quickly, i.e., at a second rate faster than the first rate (e.g., on for one-fourth second and off for one-fourth second), to warn the user that the lighting load 204 is about to turn off.

When the electronic timer 100 is in the countdown mode, the user may actuate the upper portion 116A and the lower portion 116B of the timer adjustment actuator 116. The countdown timer instantly changes to the preset timeout period that is selected by the timer adjustment actuator 116 and continues to count down from the newly selected timeout period. If the user selects the bypass mode by highlighting the top visual indicator 118 while the countdown timer is enabled, the electronic timer 100 changes to the bypass mode and disables the countdown timer.

When the countdown timer expires, i.e., after the desired timeout period has elapsed, the electronic timer 100 turns the lighting load 204 off. Before the countdown timer expires and the electronic timer 100 turns the lighting load 204 off, the user may actuate the toggle button 114 to manually turn the lighting load 204 off. Therefore, the toggle button 114 provides an override to turn off the lighting load 204 before the countdown timer expires.

According to the present invention, when the lighting load 204 is turned off, the electronic timer 100 remembers the last timeout period that was selected by the user, i.e., the preset timeout period, such that the electronic timer will use the preset timeout period when the toggle actuator 114 is subsequently actuated. Accordingly, the visual indicator 118 representing the preset timeout period is dimly illuminated when the lighting load 204 is off. The user may decide to keep the preset timeout period and simply turn the lighting load 204 on with the selected preset timeout period. Or the user may decide to adjust the timeout period using the timer adjustment actuator 116 to a different timeout period and then turn the lighting load 204 on. Thus, the electronic timer 100 according to the present invention provides a one-button recall of the preset timeout period, i.e., one actuation of the toggle button 114 when the lighting load 204 is off starts the countdown timer with the preset timeout period.

The electronic timer 100 is also operable to enter a bypass mode in which the countdown timer is disabled and power is continuously (i.e., indefinitely) provided to the lighting load 204. The electronic timer 100 enters the bypass mode in response to a number of possible actuations of the toggle button 114 and the timer adjustment actuator 116. First, when the lighting load 204 is off, the user may use the timer adjustment actuator 116 to highlight the top visual indicator 118 in the linear array (next to the 'On' label 120 as shown in FIG. 1), and subsequently press the toggle actuator 114 once to enter the bypass mode. When the lighting load 204 is on and the countdown timer is enabled, the user may use the timer adjustment actuator 116 to highlight the top visual indicator 118 and the electronic timer instantly changes to the bypass mode. Finally, the electronic timer 100 is operable to enter the bypass mode in response to a double-tap of the toggle actuator 114, i.e., two transitory actuations of the toggle actuator 114 in quick succession. To differentiate between when the electronic timer 100 is in the bypass mode rather than counting down for the timeout period, the top visual indicator 118 is preferably a different color than the other visual indicators of the linear array, for example, the top visual indicator may be green, while the other visual indicators may be orange.

When the electronic timer 100 is in the bypass mode, the user may actuate the toggle button 114 once to turn off the lighting load 204. Actuation of the lower portion 116B of the timer adjustment actuator 116 (i.e., to highlight the visual indicator 118 for 60 minutes) causes the electronic timer 100 to exit the bypass mode and to begin the countdown timer from 60 minutes. While in the bypass mode, the electronic timer 100 does not change the state of the lighting load 204 in response to either an actuation of the upper portion 116A of the timer adjustment actuator 116 or a double tap of the toggle button 114. However, the electronic timer 100 will store the bypass mode as the preset timeout period if the upper portion 116A of the time adjustment actuator 116 is pressed when the electronic timer is in the bypass mode.

When the user double-taps the toggle button 114 to enter the bypass mode, the electronic timer 100 does not save the bypass mode as the preset timeout period. Accordingly, when the user presses the toggle button 114 (to turn off the lighting load 204) and then subsequently presses the toggle button 114 again (to turn on the lighting load 204), the electronic timer 100 uses the previously-stored preset timeout period (which is not necessarily the bypass mode).

Figure 2:
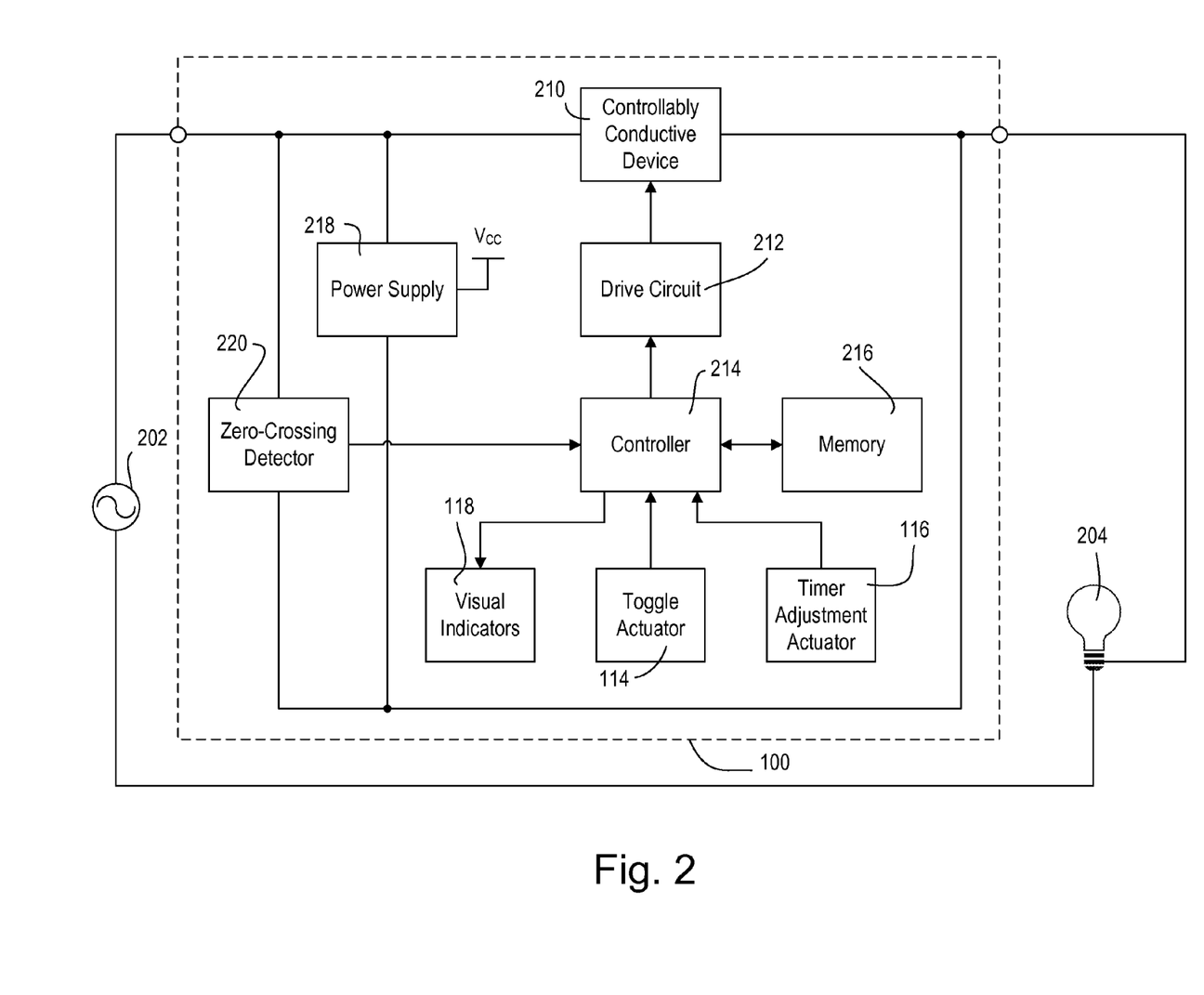
FIG. 2 is a simplified block diagram of the electronic timer of FIG. 1.

FIG. 2 is a simplified block diagram of the electronic timer 100 of the present invention. The electronic timer 100 is coupled in series electrical connection between an AC power source 202 and the lighting load 204. The electronic timer 100 comprises a controllably conductive device 210 for control of the power delivered to the lighting load 204. The controllably conductive device 210 may comprise a relay, or any suitable type of bidirectional semiconductor switch, such as, for example, a triac, a field-effect transistor (FET) in a rectifier bridge, or two FETs in anti-series connection. The controllably conductive device 210 includes a control input coupled to a drive circuit 212. The input to the control input renders the controllably conductive device 210 conductive or non-conductive, which in turn controls the power supplied to the lighting load 204.

The drive circuit 212 provides control inputs to the controllably conductive device 210 in response to command signals from a controller 214. The controller 214 is preferably implemented as a microcontroller, but may be any suitable processing device, such as a programmable logic device (PLD), a microprocessor, or an application specific integrated circuit (ASIC). The controller 214 receives inputs from the toggle actuator 114 and the timer adjustment actuator 116 and controls the visual indicators 118. The controller 214 is operable to turn on (i.e., enabling power to be delivered to) the lighting load 204, and to turn off (discontinue delivering power to) the lighting load in response to the input receives from the toggle actuator 114. The controller 214 preferably comprises a timer, e.g., a countdown timer, for counting down the preset timeout period. The controller 214 is also coupled to a memory 216 for storage of the present value of the preset timeout period. A power supply 218 generates a direct-current (DC) voltage $V_{CC}$ for powering the controller 214, the memory 216, and other low-voltage circuitry of the electronic timer 100.

A zero-crossing detector 220 determines the zero-crossings of the input AC waveform from the AC power supply 202. A zero-crossing is defined as the time at which the AC supply voltage transitions from positive to negative polarity, or from negative to positive polarity, at the beginning and end of each half-cycle. The zero-crossing information is provided as an input to the controller 214. The controller 214 provides the control inputs to the drive circuit 212 to operate the controllably conductive device 210 (i.e., to provide or block voltage from the AC power supply 202 to the lighting load 204) at predetermined times relative to the zero-crossing points of the AC waveform using a phase-control dimming technique as is well known in the art. Accordingly, the controller 214 is operable to gradually apply power to the lighting load 204 and to gradually remove power from the lighting load (i.e. to "fade" the lighting load 204 between the on state and the off state), which is described in greater detail in the '919 patent.

Figure 3:
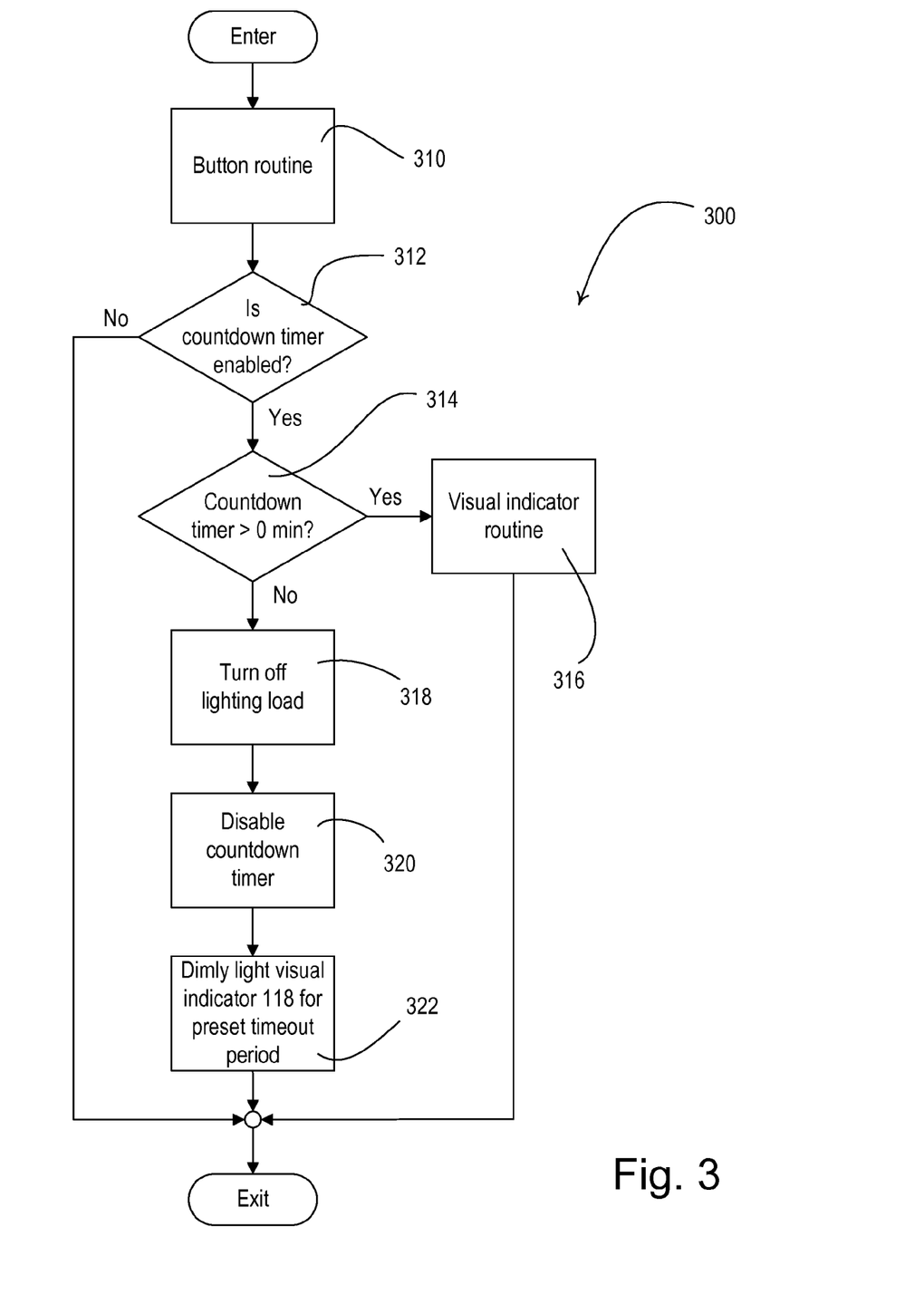
FIG. 3 is a flowchart of a timer procedure executed by a controller of the electronic timer of FIG. 1.
Figure 4A:
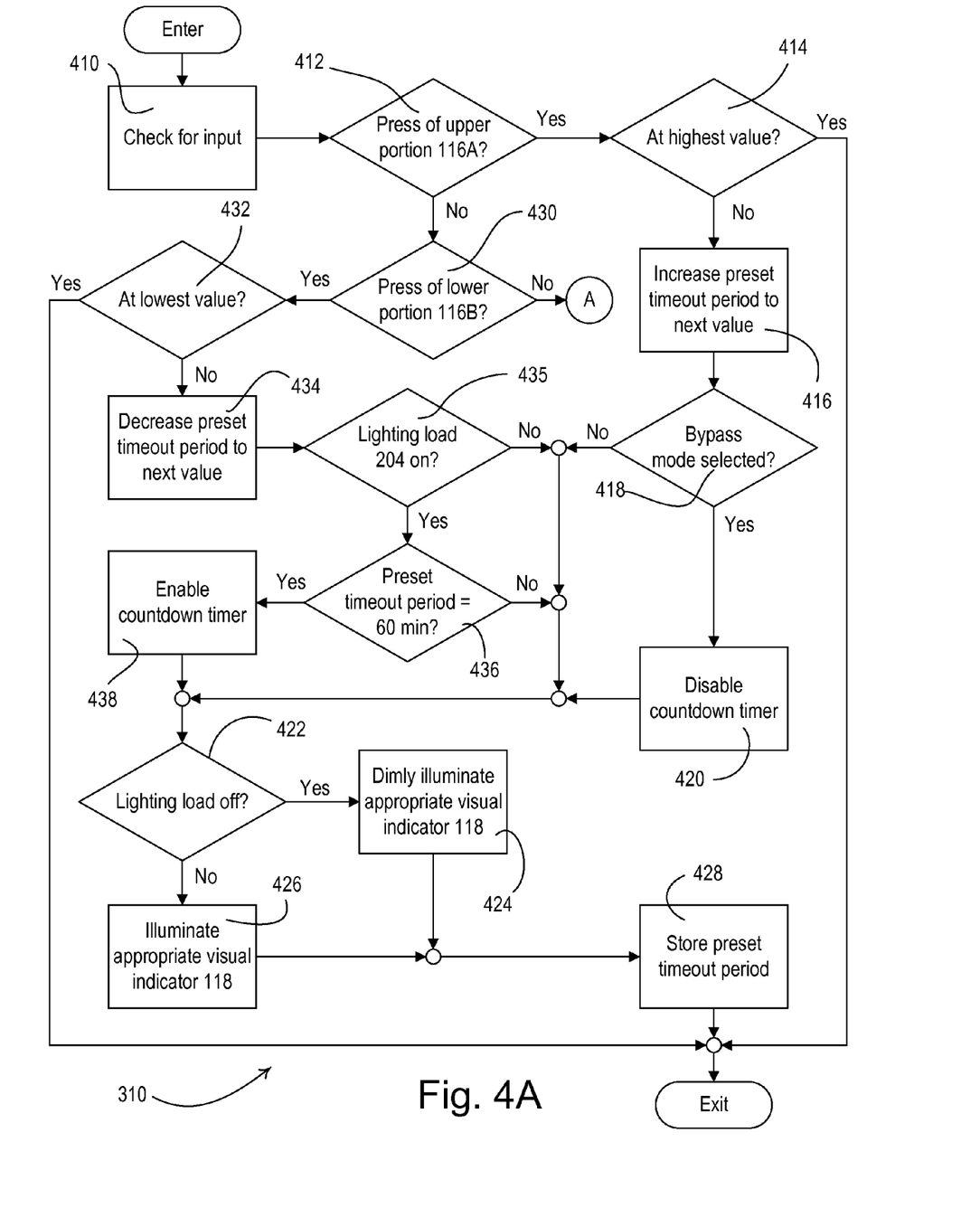
FIGS. 4A and 4B are flowcharts of a button routine of the timer procedure of FIG. 3.
Figure 4B:
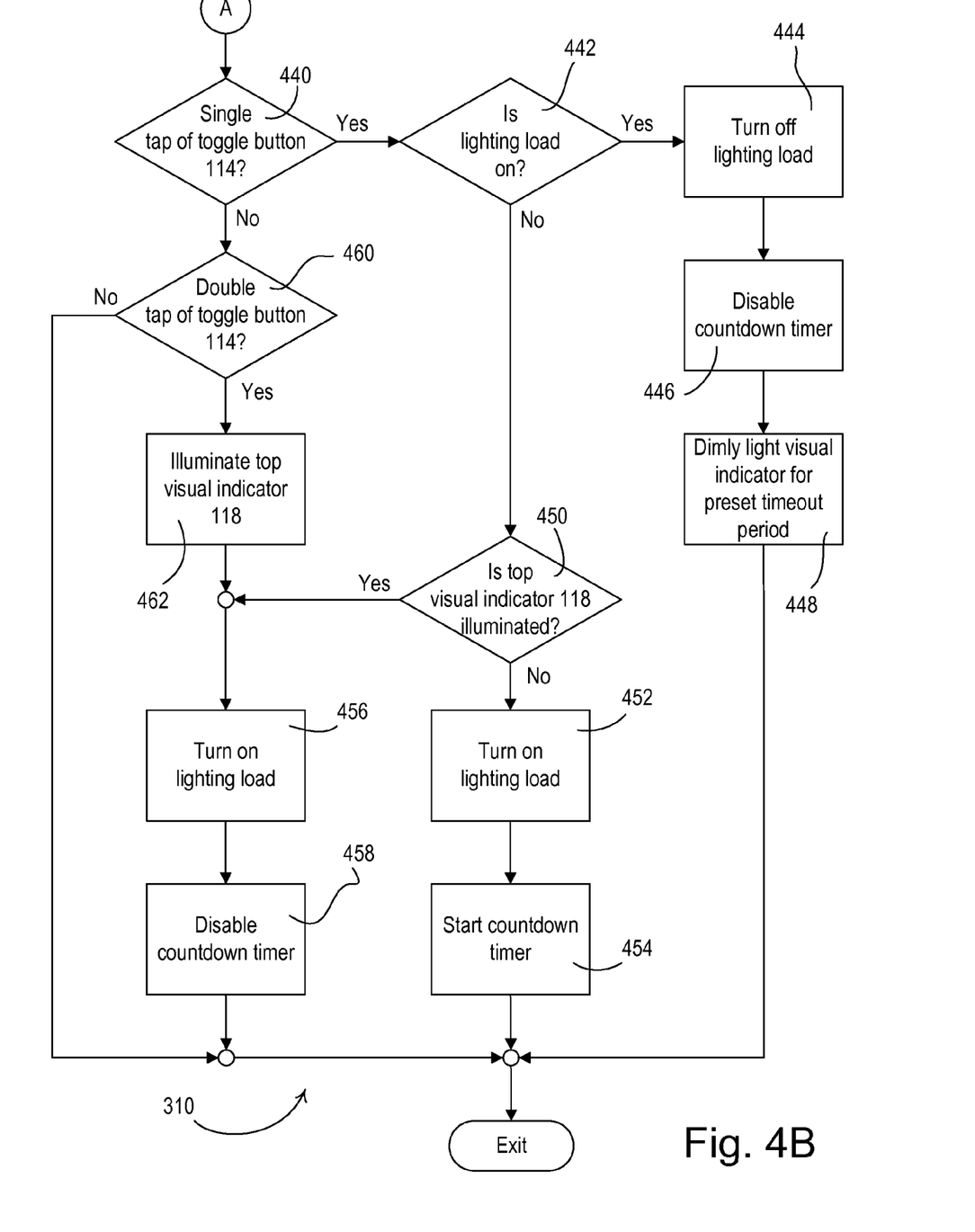

FIG. 3 is a flowchart of a timer procedure 300 executed by the controller 214 according to the present invention. Preferably, the timer procedure 300 is run periodically, e.g., as part of a main control loop. The controller 214 uses a countdown timer to determine when the preset timeout period expires to turn off the lighting load 204. FIGS. 4A and 4B are flowcharts of a button routine 310, which is the first step of the timer procedure 300. The button routine 310 checks for and processes inputs from the toggle actuator 114 and the timer adjustment actuator 116.

Referring to FIG. 4A, the button routine 310 begins by checking for inputs from the toggle actuator 114 and the timer adjustment actuator 116 at step 410. If a press of the upper portion 116A of the timer adjustment actuator 116 has been detected at step 412, a determination is made at step 414 as to whether the present value of the preset timeout period is at the highest value, i.e., the bypass mode as described in the preferred embodiment of the present invention. If the present value of the preset timeout period is at the highest value at step 414, then the button routine 310 simply exits. If the present value of the preset timeout period is not at the highest value at step 414, the value of the preset timeout period is increased to the next possible value at step 416. For example, if the present value is 30 minutes, the value of the preset timeout period is increased to 45 minutes at step 416. If the electronic timer 100 is in the bypass mode at step 418 (i.e., as selected at step 416), the countdown timer is disabled, i.e., stopped, at step 420. If the lighting load 204 is off at step 422, the appropriate visual indicator 118 is dimly illuminated at step 424. For example, the middle visual indicator is dimly illuminated if the present value of the preset timeout period is 30 minutes. If the lighting load is on at step 422, the appropriate visual indicator 118 is illuminated to a bright level at step 426. The present value of the preset timeout period (i.e., 5-60 minutes or bypass mode) is stored in the memory 216 at step 428 and the button routine 310 exits.

If a press of the upper portion 116A of the timer adjustment actuator 116 has not been detected at step 412, a determination is made at step 430 as to whether a press of the lower portion 116B of the timer adjustment actuator 116 has been detected. If a press of the lower portion 116B of the timer adjustment actuator 116 has been detected at step 430 and the present value of the preset timeout period is not at the lowest value (i.e., 5 minutes) at step 432, the present value of the preset timeout period is decreased to the next possible value at step 434. If the lighting load 204 is on at step 435 and the preset timeout period is now 60 minutes (i.e., the electronic timer 100 was previously in the bypass mode) at step 436, the countdown timer is enabled at step 438. Next, the appropriate visual indicator 118 is illuminated either to a dim level at step 424 or to a bright level at step 426. The present value of the preset timeout period is stored in the memory 216 at step 428, and the button routine 310 exits. If the present value of the preset timeout period is at the lowest value at step 432, the button routine 310 simply exits.

Referring to FIG. 4B, if a press of the upper portion 116A and the lower portion 116B of the timer adjustment actuator 116 have not been detected, a determination is made at step 440 as to whether a single tap of the toggle button 114 has occurred. If a single tap of the toggle button 114 has been detected at step 440 and the lighting load 204 is on at step 442, the lighting load is turned off at step 444. The countdown timer is stopped, i.e., disabled, at step 446 and the visual indicator 118 representing the present value of the preset timeout period is dimly lit at step 448. If the lighting load is not on at step 442 and the top visual indicator 118 is not illuminated (i.e., the bypass mode is not selected) at step 450, the lighting load 204 is turned on at step 452 and the countdown timer is started, i.e., enabled, at step 454.

If the top visual indicator 118 is illuminated (i.e., the bypass mode is selected) at step 450, the lighting load 204 is turned on at step 456 and the countdown timer is disabled at step 458. If a single tap of the toggle button 114 is not detected at step 440, but a double tap of the toggle button 114 is detected at step 460, the electronic timer 100 enters the bypass mode by illuminating the top visual indicator 118 at step 462, turning on the lighting load 204 at step 456, and disabling the countdown timer at step 458.

Referring back to FIG. 3, once the button routine 310 is completed, a determination is made at step 312 as to whether the countdown timer is enabled, i.e., counting down for the preset timeout period. If not, the timer procedure 300 simply exits. Accordingly, when the lighting load 204 is off and when the electronic timer 100 is in the bypass mode, the controller 214 will periodically execute only the button procedure 310.

Figure 5:
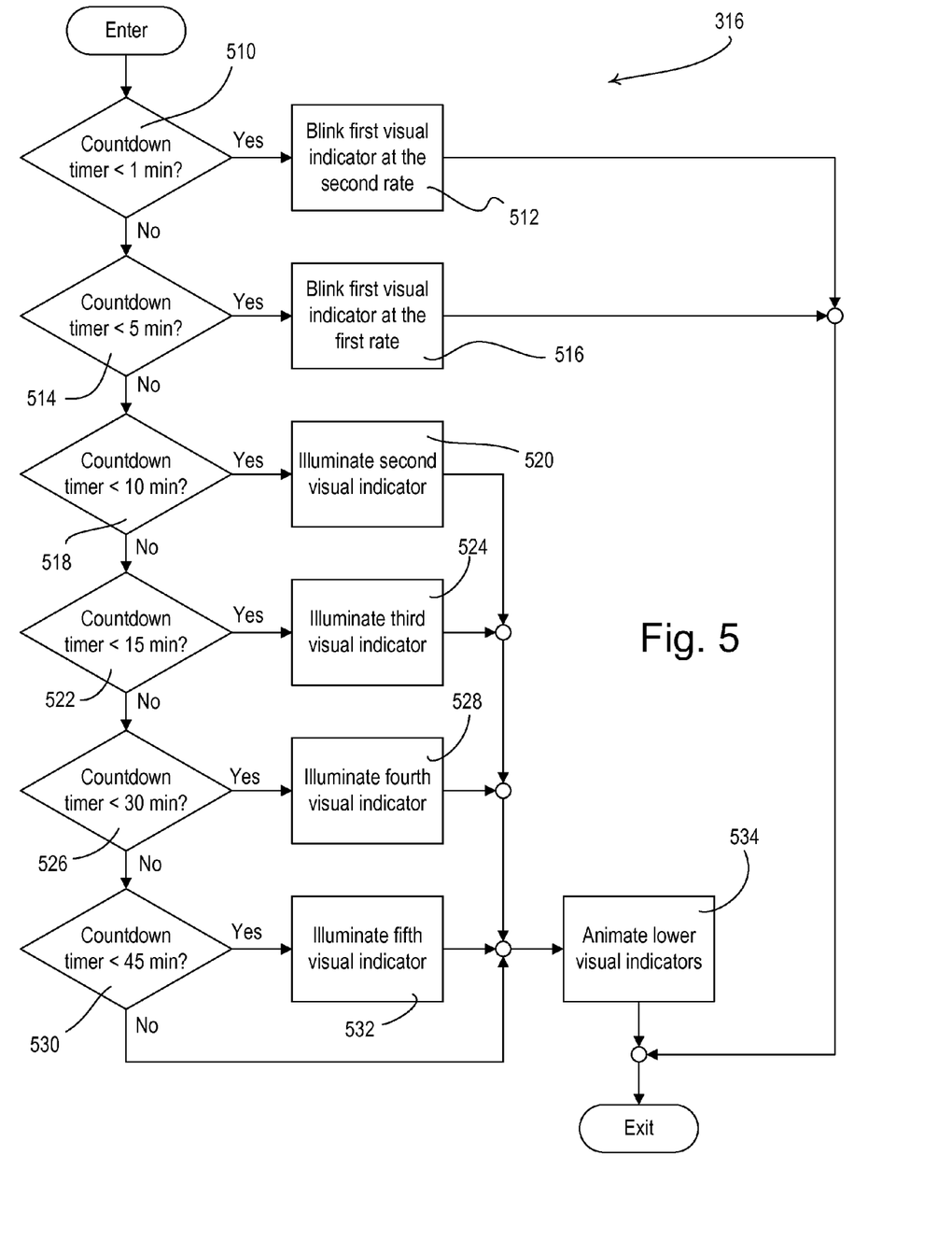
FIG. 5 is a flowchart of a visual indicator procedure of the timer procedure of FIG. 3.

If the countdown timer is enabled at step 312 and the countdown timer is greater than zero (0) minutes, i.e., has not expired, at step 314, a visual indicator routine 316 is executed. FIG. 5 is a flowchart of the visual indicator routine 316. Referring to FIG. 5, if the countdown timer is less than one (1) minute at step 510, the controller 214 blinks the first visual indicator 118, i.e., the bottom visual indicator in the linear array, at step 512, and then exits the visual indicator routine 316. Preferably, the first visual indicator 118 is blinked at the second rate, which is greater than the first rate, at step 512. If the countdown timer is less than five (5) minutes at step 514, the controller 214 blinks the first visual indicator 118 at the first rate at step 516. If the countdown timer is less than ten (10) minutes at step 518, less than fifteen (15) minutes at step 522, less than thirty (30) minutes at step 526, or less than forty-five (45) minutes at step 530, the controller constantly illuminates, respectively, the second visual indicator at step 520, the third visual indicator at step 524, the fourth visual indicator at step 528, or the fifth visual indicator at step 532. In this manner, the illuminated one of the linear array of visual indicators 118 decreases as the countdown timer decreases, and the bottom visual indicator is blinked during the last minute before the countdown timer expires.

After steps 520, 524, 528, 530, and 532, the controller 214 animates the lower visual indicators 118 at step 534 to illustrate that the countdown timer is actively counting down. Accordingly, the controller 214 may execute a routine during step 534, such that the visual indicators 118 in the linear array below the constantly illuminated visual indicator (i.e., illuminated in steps 520, 524, 528, and 532) are cycled in a decreasing fashion. Alternatively, another animation could be implemented. For example, the visual indicators 118 in the linear array below the constantly illuminated visual indicator could each be turned on (rather than cycled) one-by-one in a decreasing fashion. Such animation routines are easily programmed by one skilled in the art and are not discussed in greater detail herein.

Referring back to FIG. 3, if the countdown timer has expired, i.e., is less than or equal to zero (0) minutes, at step 314, the controller 214 turns off the lighting load 204 at step 318. At step 320, the countdown timer is disabled. The visual indicator 118 representative of the preset timeout period is dimly illuminated at step 322 and the timer procedure 300 exits.

The bypass mode may be disabled, for example, by using an advanced programming procedure of the electronic timer 100. Accordingly, when the bypass mode is disabled, the user cannot cause the electronic timer 100 to enter the bypass mode by using the toggle button 114 or the timer adjustment actuator 116. Further, the electronic timer 100 may be programmed to operate with a "locked" or "protected" preset timeout period, i.e., the preset timeout period cannot be changed, via the advanced programming mode. An exemplary advanced programming procedure is described in greater detail in U.S. patent application Ser. No. 10/892,510, filed Jul. 15, 2004, entitled PROGRAMMABLE WALLBOX DIMMER, the entire disclosure of which is hereby incorporated by reference.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A wall-mountable electrical timer for controlling the power delivered to an electrical load from an AC power source, the electrical timer comprising:

a toggle actuator for enabling delivery of power to the load;

a countdown timer adapted to begin counting down for a predetermined period of time in response to an actuation of the toggle actuator, the electrical timer disabling the delivery of power to the load in response to the countdown timer having counted down for the predetermined period of time; and a plurality of visual indicators arranged in a linear array, one of the plurality of visual indicators is illuminated constantly to indicate a time period remaining until the delivery of power to the load is disabled, the visual indicators operable to provide an animated visual feedback to indicate that the countdown timer is counting down for the predetermined time period;

wherein the animated visual feedback includes cycling the visual indicators below the one of the plurality of visual indicators that is illuminated constantly.

2. The electrical timer of claim 1, wherein the visual indicators are operable to provide pre-off visual feedback to indicate that the delivery of power to the load is about to be disabled.

3. The electrical timer of claim 1, wherein the pre-off visual feedback includes blinking one of the visual indicators.

4. The electrical timer of claim 1, wherein the animated visual feedback includes sequentially illuminating and extinguishing each one of the visual indicators below the one of the visual indicators that is illuminated constantly.

5. The electrical timer of claim 1, further comprising:
a timer adjustment actuator for determining the length of the predetermined time period;
wherein the visual indicators are operable to provide pre-on visual feedback to indicate, prior to enabling of delivery of power to the load, the length of the predetermined time period.

6. The electrical timer of claim 1, wherein the linear array of visual indicators is arranged vertically and the animated visual feedback includes cycling the visual indicators below the one of the plurality of visual indicators that is illuminated constantly in a downward fashion.

7. A two-wire wall-mountable electrical timer for controlling the power delivered to an electrical load from an AC power source, the electrical timer comprising:
a toggle actuator for turning on the load, wherein the electrical timer is operable to turn off the load after a preset timeout period after the load is turned on; and
a plurality of visual indicators operable to provide a visual feedback indicative of the preset timeout period when the load is off.

8. The electrical timer of claim 7, further comprising:
a user-actuable air-gap switch operable to be coupled in series electrical connection between the source and the load for disconnecting the source from the load.

9. A user interface for a wall-mountable electrical timer operable to control the power delivered to an electrical load from an AC power source, the user interface comprising:
a timer adjustment actuator for adjustment of a preset timeout period of the electrical timer;
a plurality of visual indicators operable to display a representation of the preset timeout period; and
a toggle actuator for enabling power to be delivered to the load;
wherein the plurality of visual indicators are operable to display the representation of the preset timeout period before the delivery of power to the load has been enabled in response to an actuation of the toggle actuator, such that the electrical timer is operable to discontinue delivering power to the load after the preset timeout period has elapsed.

10. A method of controlling with a wall-mountable load control device the power delivered to an electrical load from an AC power source, the method comprising the steps of:
selecting a preset timeout period using a timer adjustment actuator while the electrical load is not powered;
displaying a representation of the preset timeout period using a plurality of visual indicators while the electrical load is not powered;
subsequently actuating a toggle actuator;
enabling the delivery of power to the load in response to the step of actuating the toggle actuator;
initializing a timer with the preset timeout period in response to the step of actuating the toggle actuator;
starting the timer in response to the step of actuating the toggle actuator; and
discontinuing the delivery of power to the load when the preset timeout period has elapsed.

11. The method of claim 10, wherein the step of displaying a representation of the preset timeout period further comprises illuminating one of the visual indicators a first color to represent the remaining length of the time timeout period.

12. The method of claim 11, further comprising the step of:
entering a bypass mode in which power is indefinitely provided to the load.

13. The method of claim 12, wherein the plurality of visual indicators are arranged in a vertical linear array, the method further comprising the step of:
illuminating a top one of the linear array of visual indicators constantly to indicate that the electrical timer is in the bypass mode;
wherein the step of displaying a representation of the preset timeout period further comprises illuminating one of the visual indicators below the top visual indicator the first color to represent the remaining length of the time timeout period.

14. The method of claim 13, wherein the step of illuminating a top one of the linear array of visual indicators constantly to indicate that the electrical timer is in the bypass mode further comprises illuminating the top one of the linear array of visual indicators a second color.

15. A method of controlling with a wall-mountable load control device the power delivered to an electrical load from an AC power source, the method comprising the steps of:
actuating a toggle actuator;
enabling the delivery of power to the load in response to the step of actuating the toggle actuator;
initializing a countdown timer with a predetermined time period;
starting the countdown timer in response to the step of actuating the toggle actuator;
providing a plurality of visual indicators arranged in a linear array on the wall-mountable load control device;
constantly illuminating one of the plurality of visual indicators to indicate a time period remaining until the countdown timer expires;
illuminating the visual indicators to provide an animated visual feedback to indicate that the countdown timer is counting down for the predetermined time period after the step of starting the countdown timer and before the countdown timer expires; and
discontinuing the delivery of power to the load when the predetermined time period has elapsed;
wherein the step of illuminating the visual indicators to provide an animated visual feedback comprises sequentially illuminating and extinguishing each one of the visual indicators below the one of the visual indicators that is illuminated constantly.

16. The method of claim 15, wherein the linear array of visual indicators is arranged vertically and the step of illuminating the visual indicators to provide an animated visual feedback further comprises cycling each one of the visual indicators below the one of the visual indicators that is illuminated constantly in a downward fashion.

17. A method of controlling with a wall-mountable load control device the power delivered to an electrical load from an AC power source, the method comprising the steps of:
actuating a toggle actuator;
enabling the delivery of power to the load in response to the step of actuating the toggle actuator;
discontinuing the delivery of power to the load when a preset timeout period has elapsed; and
providing a visual feedback indicative of the preset timeout period before the step of enabling the delivery of power to the load and after the step of discontinuing the delivery of power to the load.

* * * * *